(12) United States Patent
Okita et al.

(10) Patent No.: US 7,023,335 B2
(45) Date of Patent: Apr. 4, 2006

(54) SEAT BELT WARNING APPARATUS AND METHOD

(75) Inventors: Munechika Okita, Nissin (JP); Masanori Oyabu, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 67 days.

(21) Appl. No.: 10/763,202

(22) Filed: Jan. 26, 2004

(65) Prior Publication Data
US 2004/0150517 A1 Aug. 5, 2004

(30) Foreign Application Priority Data
Jan. 31, 2003 (JP) .............................. 2003-024432

(51) Int. Cl.
*B60Q 1/00* (2006.01)
(52) U.S. Cl. .............................. 340/457.1; 340/425.5; 340/457; 340/438; 340/459
(58) Field of Classification Search ............ 340/697.3, 340/692, 457.1, 384.4, 384.7, 425.5, 457, 340/458, 459; 701/29
See application file for complete search history.

(56) References Cited

U.S. PATENT DOCUMENTS

| 5,012,221 A | * | 4/1991 | Neuhaus et al. ......... 340/384.5 |
| 5,483,221 A | * | 1/1996 | Mutter et al. ............ 340/457.1 |
| 5,923,256 A | * | 7/1999 | Satake et al. ............... 340/575 |
| 6,278,358 B1 | | 8/2001 | Spoto et al. ............. 340/425.5 |
| 6,317,052 B1 | * | 11/2001 | Welling et al. .......... 340/691.1 |
| 6,501,374 B1 | * | 12/2002 | King et al. .............. 340/457.1 |

* cited by examiner

*Primary Examiner*—Jeffery Hofsass
*Assistant Examiner*—Hoi C. Lau
(74) *Attorney, Agent, or Firm*—Oliff & Berridge, PLC

(57) ABSTRACT

The alert sound having specific frequencies and volume is repeated at a different cycle depending upon each warning level. Additionally, or alternatively, the audible alert corresponding to the lowest warning level is activated before activating the audible alert corresponding the present warring level.

20 Claims, 3 Drawing Sheets

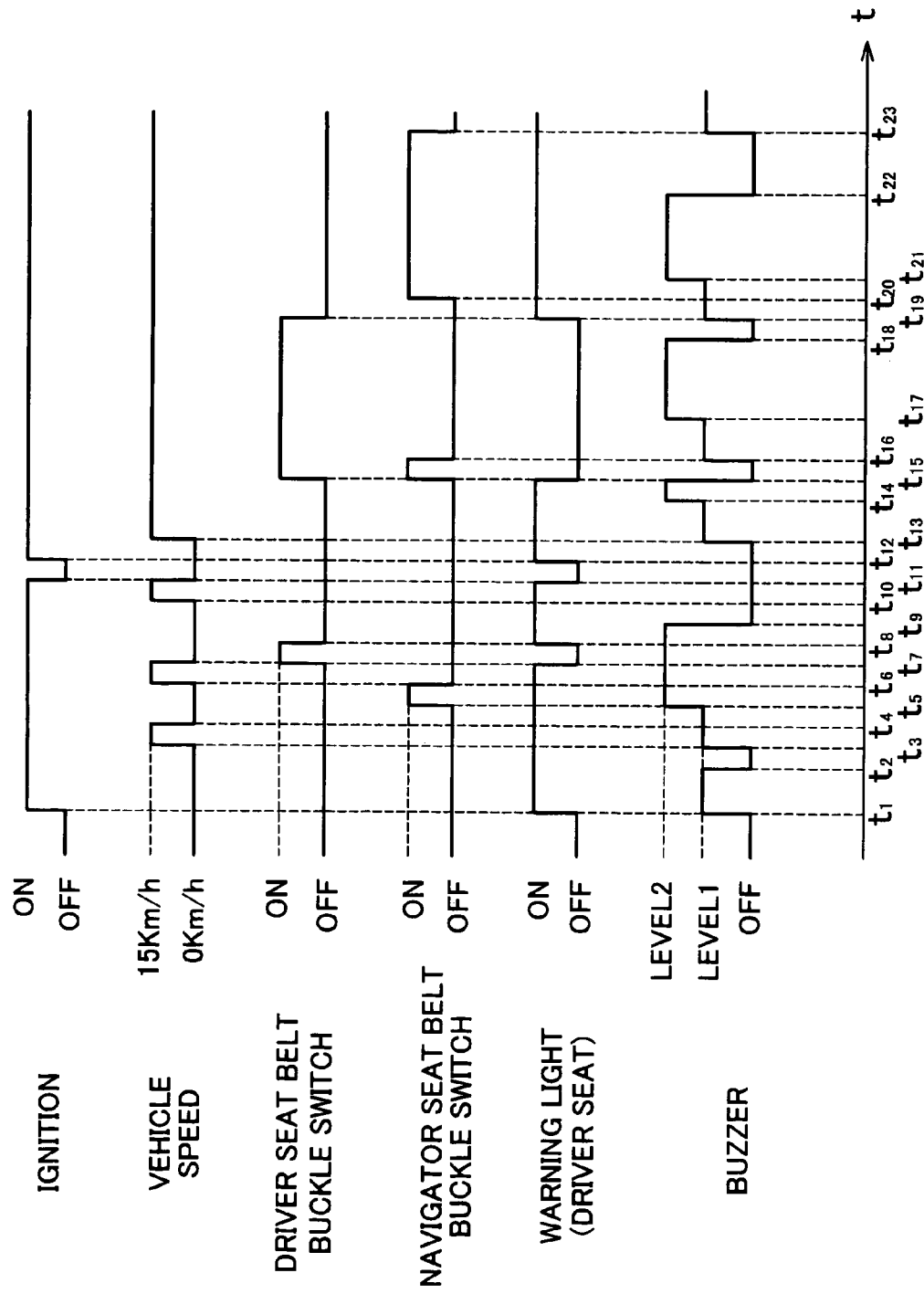

SEAT BELT WARNING APPARATUS AND METHOD

INCORPORATION BY REFERENCE

The disclosure of Japanese Patent Application No. 2003-024432 filed on Jan. 31, 2003 including the specification, drawings and abstract is incorporated herein by reference in its entirety.

BACKGROUND OF THE INVENTION

1. Field of the Invention

The present invention generally relates to a seat belt warning apparatus that generates an alert sound to alert, or remind, a vehicle occupant that his or her seat belt is unbuckled. More specifically, it relates to the same apparatus configured to generate the alert sound in a different way depending upon each warning level, and a method corresponding to the operation of such an apparatus.

2. Description of the Related Art

One known system (see U.S. Pat. No. 6,278,358) triggers an alert sound in two steps to remind an occupant that his or her seat belt is unbuckled depending upon the vehicle speed. Typically, a waning system of this kind starts up when the ignition is turned on, and determines the seat belt to be in the buckled condition in response to a corresponding seat belt buckle switch turning on. With such a system, therefore, the alert sound sounds from the ignition turning on until the seat belt buckle switch turning on.

The above audible alert triggered upon starting up the vehicle is generally called "a primary audible alert", and one related US regulation prohibits that such an alert lasts longer than 8 seconds. The system disclosed in the above publication is arranged to cope with this requirement, which monitors, after provision of the primary audible alert, the vehicle speed and triggers a secondly audible alert in response to the vehicle starting running.

With this system, however, if a different alert sound is used for each audible alert (i.e., primary audible alert, secondary audible alert), the occupant may not realize that the secondary audible alert is alerting him or her that his or her seat belt is unbuckled due to other audible indications indicating the headlight still remaining "ON", etc. This situation is more likely when the primary audible alert is deactivated within 8 seconds as required in the above-stated US regulation, because there is a time period of no alert (i.e., alert sound) from the end of the primary audible alert to the beginning of the secondary audible alert.

It is true that the occupant can easily associate both the primary and secondary audible alerts with the unbuckled seat belt if the same alert sound is generated in the same way for each alert. This would however make it impossible to provide a classified alert system capable of producing a higher warning level alert when the vehicle is running than when the vehicle is stationary. Also, it should be appreciated that, if the same alert sound is generated in the same way during the primary audible alert as the secondary audible alert that is a relatively strong warning, that excessively strong primary audible alert may annoy the occupant because it is activated almost every time he or she starts the vehicle.

Thus, it is difficult to achieve such a classified seat belt alert system which assures the occupant's correct recognition of each audible alert.

SUMMARY OF THE INVENTION

To solve the above-mentioned problems, the present invention has been made to provide a seat belt warning apparatus for a vehicle occupant, which provides an audible alert corresponding to each different warning level.

To achieve this object, a first aspect of the invention relates to a seat belt warning apparatus for a vehicle occupant including a seat belt, an audible indicator for generating an alert sound having prescribed frequencies and volume, and a controller for providing via the audible indicator, either one of a first audible alert corresponding to a first warning level and a second audible alert corresponding to a second warning level that is higher than the first warning level when the seat belt is unbuckled. The controller is adapted to sound a first alert chime by repeating the alert sound at a first cycle during the first audible alert, and a second alert chime by repeating the same alert sound at a second cycle that is different from the first cycle, during the second audible alert.

According to this apparatus, the same alert sound (frequency, volume) is used during each audible alert. Thus, the occupant can easily realize that the alert is alerting him or her of the unbuckled seat belt. Moreover, a plurality of audible alerts can be provided by only repeating the alert sound at different cycles in accordance with the warning level.

It should be noted that the cycle of repeating the alert sound is changed by changing the length of generating each alert sound, as well as by changing the time interval at which the alert sound is repeated.

A second aspect of the invention relates to a seat belt warning apparatus for a vehicle occupant including a seat belt, an audible indicator for generating an alert sound, a controller for a controller for providing either one of a first audible alert corresponding to a first warning level and a second audible alert corresponding to a second warning level that is higher than the first warning level when the seat belt is unbuckled. This controller is adapted to sound via the audible indicator an alert chime corresponding to the first warning level before an alert chime corresponding to the second warning level during the second audible alert.

According to the second aspect of the invention, in a case where the secondary audible alert should be activated after the primary audible alert was stopped so as to comply with the above-stated US regulation, sounding the alert chime corresponding to the first warning level (i.e., lower warning level), with which the occupant is relatively familiar, prior to the alert chime corresponding to the second warning level (i.e., higher warning level) makes it easier for the vehicle occupant to realize that the alert is alerting him or her of the unbuckled seat belt.

A third aspect of the invention relates to a method of providing a vehicle occupant with a first audible alert corresponding to a first warning level or a second audible alert corresponding to a second warning level that is higher than the first warning level, to alert the vehicle occupant that his or her seat belt is unbuckled. This method includes the steps of: sounding a first alert chime by repeating an alert sound having prescribed frequency and volume at a first cycle during the first audible alert; and sounding a second alert chime by repeating the same alert sound at a second cycle during the second audible alert.

A fourth aspect of the invention relates to a method of providing a vehicle occupant with a first audible alert corresponding to a first warning level or a second audible alert corresponding to a second warning level that is higher than the first warning level, to alert the vehicle occupant that his or her seat belt is unbuckled. In this method, during the second audible alert, an alert chime corresponding to the first warning level is sounded before an alert chime corresponding to the second warning level.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein:

FIG. 3 is a timing chart illustrating one exemplary case for explaining the operation of the seat belt warning system of the embodiment.

DETAILED DESCRIPTION OF THE PREFERRED EMBODIMENTS

Hereinafter, a seat belt waning apparatus according to one exemplary embodiment of the invention will be described with reference to the accompanying drawings. To comply with the US regulation previously stated, this apparatus is configured to deactivate the primary audible alert within 8 seconds.

Figure 1:
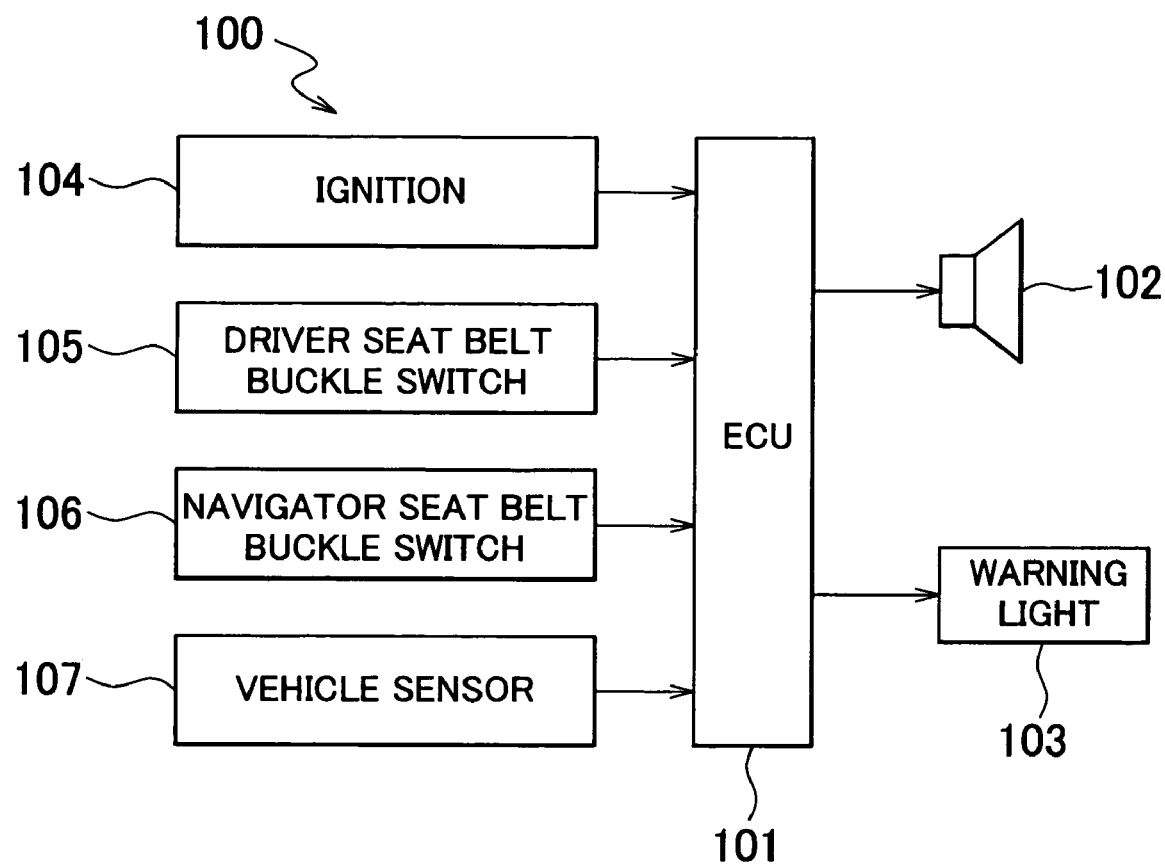
FIG. 1 is a block diagram showing the configuration of a seat belt warning apparatus according to one exemplary embodiment of the present invention.

FIG. 1 is a block diagram schematically showing the configuration of a seat belt warning apparatus 100 of the exemplary embodiment. Referring to this drawing, the seat belt warning apparatus 100 includes a buzzer 102 for generating an alert sound, an ECU (Electric Control Unit) 101 that activates an audible alert in response to detecting the seat belt being unbuckled, and an warning light 103 that is on or blinks while the seat belt remains unbuckled. The warning light 103 may individually be provided for each of the driver seat and the navigator seat.

The seat belt apparatus further includes an ignition 104, a driver seat belt buckle switch 105, and a navigator seat belt buckle switch 106. The ECU 101 detects the state of the ignition 104 being at the ON or OFF position, the driver seat belt buckle switch 105 being ON or OFF, and the navigator seat belt buckle switch 106 being ON or OFF. Also, the ECU 101 detects the vehicle speed via a vehicle speed sensor 107. The driver seat belt buckle switch 105 is ON when the driver seat belt is buckled, and OFF when unbuckled, and the navigator seat belt buckle switch 106 is ON when the navigator seat belt is buckled, and OFF when unbuckled.

Figure 2A:
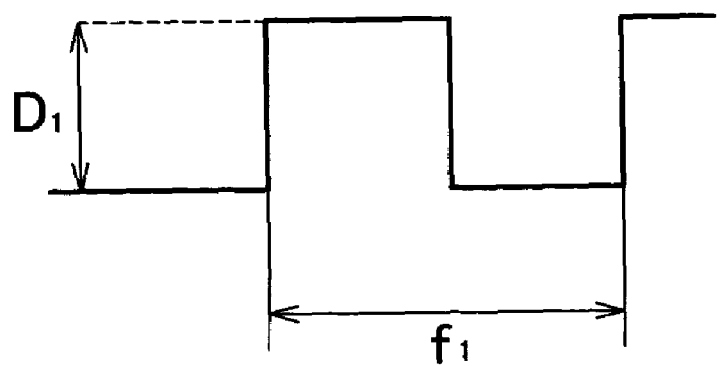
FIG. 2A is a view illustrating a pattern of generating an audible sound to produce a first alert chime.
Figure 2B:
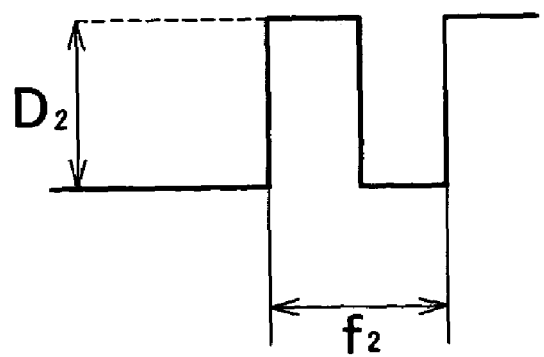
FIG. 2B is a view illustrating a pattern of generating an audible sound to produce a second alert chime.

FIG. 2A is a view schematically illustrating generation pattern of an alert sound via the buzzer 102 to sound a "first alert chime", while FIG. 2B is a view schematically illustrating a generation pattern of the same chime to sound a "second alert chime". Unless otherwise specified, the first alert chime corresponds to the primary audible alert, whereas the second alert chime corresponds to the secondary audible alert.

The alert sound generated for sounding each alert chime has common frequencies (e.g., 800 Hz and 1.9 kHz), duty ratio (e.g., D1=D2=50%), and sound volume (e.g., 63 dB). Namely, the buzzer 102 generates substantially the same sound for each alert chime.

In each chime, however, the alert sound is repeated at a different cycle to indicate a specific warning level so that the occupant can distinguish each alert (warning level) by that repetition cycle of the alert sound. In this exemplary embodiment, the first alert chime adopts a repetition cycle f1 of 1.2 second, and the second alert chime adopts a repetition cycle f2 of 0.4 second.

Hereinafter, conditions of activating and deactivating each alert will be described. First, the activating conditions will be described. The ECU 101 activates a primary audible alert in response to the driver seat belt buckle switch 105 being OFF upon turning on the ignition 104 to the ON position. Because this is a primary audible alert, for example, the first alert chime continues for 6 seconds (1.2 sec*5).

Then, if at least one of the driver seat belt and the navigator seat belt still remains unbuckled and the vehicle is running at 15 km/h or more after the primary audible alert ends, the ECU 101 then activates the secondary audible alert.

According to the exemplary embodiment, the secondary audible alert first sounds the first alert chime for 30 seconds, and the second alert chime for 90 seconds. In other words, the same sound is repeated for a total of 120 seconds, during which the cycle at which the alert sound is repeated is shortened. Such repetition of the alert sound makes it easier for the occupant to realize the chime is alerting him or her of the unbuckled seat belt, and then notice by the shortened repetition cycle that the present warning level for that unbuckled seat belt is higher than the warning level of the primary audible alert triggered upon turning on the ignition 104.

Also, if the secondary audible alert is timed out with one of the buckle switches being ON and the same switch then turns off, the ECU 101 activates the secondary audible alert again from the first alert chime.

The ECU 101 ignores satisfaction of the above-stated conditions of activating the primary and secondary audible alerts when the buzzer 102 is sounding each alert chime. That is, under no circumstance, the first alert chime interrupts the second alert chime.

Next, the deactivating conditions will be described. The ECU 101 deactivates the primary audible alert in response to the ignition 104 being turned to the OFF position, the driver seat belt buckle switch 105 being turned on, or the elapse of the activation time of the primary audible alert (i.e., 6 seconds). Similarly, the ECU 101 deactivates the secondary audible alert in response to the ignition 104 being turned to the OFF position, the driver seat belt buckle switch 105 and the navigator seat belt buckle switch 106 being both turned on, or the elapse of the activation time of the secondary audible alert (90 seconds from the shift to the second alert chime).

Once the condition of activating the alert is satisfied, the vehicle speed will no more be used as a parameter. That is, once the secondary audible alert has been activated, the ECU 101 will not turn off the buzzer 102 even if the vehicle stops during activation of the alert. Also, even if the vehicle accelerates up to 15 km/h or more after the secondary audible alert has been timed out, the ECU 101 will not turn on the buzzer 102 again.

FIG. 3 is a timing chart illustrating one exemplary case for explaining the operation of the seat belt warning apparatus 100. Referring to the chart, the ignition 104 is turned to the ON position at time t1. Since the driver seat belt buckle switch 105 and the navigator seat belt buckle switch 106 are both OFF at this time, namely the driver seat belt and the navigator seat belt both remain unbuckled, the ECU 101 activates the primary audible alert by sounding the first alert chime via the buzzer 102. To comply with the above-stated US regulation, this audible alert continues for 6 seconds and ends at time t2.

Then, the vehicle starts running although the seat belts both remain unbuckled, When the vehicle speed reaches 15 Km/h at time t3, the ECU 101 then triggers the secondary audible alert starting with the first alert chime.

The vehicle stops at time t4. However, since the buzzer 102 is still sounding the first alert chime at this time, the ECU 101 ignores this change in the vehicle speed associated with the stop of the vehicle and continues the first alert chime.

At time t5, 30 seconds of the first alert chime ends, and the second alert chime starts. Although the navigator seat belt is buckled at time t5, the ECU 101 does not deactivate the secondary audible alert because the driver seat belt still remains unbuckled.

Subsequently, the driver seat belt is unbuckled and the vehicle speed reaches 15 Km/h at time t6. However, this does not satisfy any deactivating condition, so that the ECU 101 continues the second alert chime.

Then, the vehicle again stops and the driver seat belt is buckled at time t7. At this stage, the ECU 101 turns off the warning light 103 in response to the driver seat belt being buckled, however continues the second alert chime due to the navigator seat belt still unbuckled.

Then, the driver seat belt is unbuckled and the warning light 103 turns on at time t8. Here, as aforementioned, the ECU 101 ignores satisfaction of any activating condition because the buzzer 102 is sounding the alert chime, and therefore the ECU 101 does not restart the secondary audible alert from the first alert chime in response to the driver seat belt being buckled, but continues the second alert chime.

At time t9, 90 seconds of the second alert chime ends, namely the secondary audible alert is timed out although both the driver and navigator seat belts remain unbuckled.

The vehicle speed again reaches 15 Km/h at time t10. However, because the secondary audible alert has been triggered before, the ECU 101 ignores this change in parameter (i.e., vehicle speed).

When the vehicle stops and the ignition 104 is turned to the OFF position at time t11, the ECU 101 turns off the buzzer 102.

The ignition 104 is again turned to the ON position at time t12. Because both the driver and navigator seat belts remain unbuckled at this time, the ECU 101 turns on the warning light 103 and activates the primary audible alert sounding the first alert chime via the buzzer 102.

At time t13, the alert mode immediately shifts from the primary audible alert to the secondary audible alert in response to the vehicle speed reaching 15 Km/h. In the initial stage of the secondary audible alert, as aforementioned, the ECU 101 first sounds the first alert chime for 30 seconds, and starts the second alert chime at time t14.

Subsequently, the driver and navigator seat belts are both buckled at time t15 while the vehicle is still running. Because this satisfies the condition of deactivating the secondary audible alert, the ECU 101 immediately turns off the buzzer 102 sounding the second alert chime.

Then, the navigator seat belt is unbuckled at time t16, and therefore the secondary audible alert is again activated from the first alert chime.

This chime lasts 30 seconds and the cycle at which the alert sound is repeated is changed at time t17 (i.e., the beginning of the second alert chime). At time t18, which is 90 seconds after time t17, the secondary audible alert is timed out due to the navigator seat belt still unbuckled.

At time t19, the ECU 101 re-triggers the secondary audible alert from the first alert chime in response to the driver seat belt being unbuckled, since the last secondary audible alert was timed out with the driver seat belt buckled.

Although the navigator seat belt is buckled at time t20, the first alert chimes continue since the driver seat belt still remains unbuckled. The second alert chime starts at time t21 which is 30 seconds after time t19, and the secondary audible alert is timed out at time 22 which is 90 seconds after time t21.

Thus, the secondary audible alert is timed out with the navigator seat belt buckled. Therefore, the ECU 101 activates the secondary audible alert again from the first alert chime at time t23 in response to the navigator seat belt being unbuckled.

According to the exemplary embodiment, as described above, the ECU 101 sounds the same chime via the buzzer 102 in the initial stage of the secondary audible alert as during the primary audible alert that the occupant usually hears when starting the vehicle. Therefore, the occupant can readily realize that his or her seatbelt is unbuckled at the beginning of the secondary audible alert.

Also, during the secondary audible alert, the cycle at which the alert sound (i.e., sound of the same frequencies and volume) is repeated is shortened. This makes the occupant notice that the present warning level for the unbuckled seat belt becomes higher than the primary audible alert, while assuring the correct recognition of the occupant as to the unbuckled seat belt warning.

While the invention has been described with reference to the exemplary embodiments thereof, it is to be understood that the invention is not limited to the preferred embodiment or construction. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A seat belt warning apparatus for a vehicle occupant, comprising:
    a seat belt;
    an audible indicator for generating an alert sound; and
    a controller for providing via the audible indicator, either one of a first audible alert corresponding to a first warning level and a second audible alert corresponding to a second warning level that is higher than the first warning level when the seat belt is unbuckled, the controller being adapted to sound a first alert chime by repeating an alert sound having prescribed frequency and volume at a first cycle during the first audible alert, and a second alert chime by repeating the same alert sound at a second cycle that is different from the first cycle, during the second audible alert, wherein the controller is further adapted to sound the first alert chime via the audible indicator in an initial stage of the second audible alert, prior to sounding the second alert chime.

2. A seat belt warning apparatus as set forth in claim 1, wherein
    the controller is further adapted to activate the first audible alert in response to detecting the seat belt being unbuckled upon turning on the ignition of the vehicle, and activate the second audible alert in response to detecting the seat belt being unbuckled when the vehicle is running at a prescribed speed or more.

3. A seat belt warning apparatus for a vehicle occupant, comprising:
a seat belt;
an audible indicator for generating an alert sound;
a controller for providing via the audible indicator, either one of a first audible alert corresponding to a first warning level and a second audible alert corresponding to a second warning level that is higher than the first warning level when the seat belt is unbuckled, the controller being adapted to sound via the audible indicator an alert chime corresponding to the first warning level before an alert chime corresponding to the second warning level during the second audible alert.

4. A method of providing a vehicle occupant with a first audible alert corresponding to a first warning level or a second audible alert corresponding to a second warning level that is higher than the first warning level, to alert the vehicle occupant that his or her seat belt is unbuckled, the method comprising the steps of:
sounding a first alert chime by repeating an alert sound having prescribed frequency and volume at a first cycle during the first audible alert; and
sounding a second alert chime by repeating the same alert sound at a second cycle during the second audible alert, wherein the first alert chime is sounded in an initial stage of the second audible alert prior to sounding the second alert chime.

5. A method as set forth in claim 4, wherein
the first audible alert is activated in response to detecting the seat belt being unbuckled upon turning on the ignition of the vehicle, and
the second audible alert is activated in response to detecting the seat belt being unbuckled when the vehicle is running at a prescribed speed or more.

6. A method of providing a vehicle occupant with a first audible alert corresponding to a first warning level or a second audible alert corresponding to a second warning level that is higher than the first warning level, to alert the vehicle occupant that his or her seat belt is unbuckled, wherein
during the second audible alert, an alert chime corresponding to the first waning level is sounded before an alert chime corresponding to the second warning level.

7. The seat belt warning apparatus as set forth in claim 2, wherein once the second audible alert has been sounded, the controller will not base further activation of the second audible alert on vehicle speed.

8. The seat belt warning apparatus as set forth in claim 1, wherein the second audible alert sounds the first alert chime for a first period of time and immediately sounds the second alert chime for a consecutive, second period of time.

9. The seat belt warning apparatus as set forth in claim 1, wherein the second repetition cycle is about three times shorter than the first repetition cycle.

10. The seat belt warning apparatus as set forth in claim 3, wherein once the second audible alert has been sounded, the controller will not base further activation of the second audible alert on vehicle speed.

11. The seat belt warning apparatus as set forth in claim 3, wherein the second audible alert sounds the first alert chime for a first period of time and immediately sounds the second alert chime for a consecutive, second period of time.

12. A method as set forth in claim 4, wherein the second audible alert sounds the first alert chime for a first period of time and immediately sounds the second alert chime for a consecutive, second period of time.

13. A method as set forth in claim 4, wherein the second repetition cycle is about three times shorter than the first repetition cycle.

14. A method as set forth in claim 5, wherein once the ignition has been turned on and the second alert has been activated a first time, subsequent activation of the second audible alert is not based on vehicle speed.

15. A method as set forth in claim 5, wherein upon buckling of the seat belt, the respective first or second audible alert activated is shut off.

16. A method as set forth in claim 15, wherein upon subsequent detection of the seat belt being unbuckled, the second audible alert is activated.

17. A method as set forth in claim 6, wherein the second audible alert sounds the first alert chime for a first period of time and immediately sounds the second alert chime for a consecutive, second period of time.

18. A method as set forth in claim 6, wherein upon buckling of the seat belt, the respective first or second audible alert activated is shut off.

19. A method as set forth in claim 18, wherein upon subsequent detection of the seat belt being unbuckled, the second audible alert is activated.

20. The seat belt warning apparatus as set forth in claim 2, wherein the alert sound is a composite sound formed from at least two frequencies chimed with a predetermined duty ratio, and a second audible alert repetition cycle is shorter than a first audible alert repetition cycle.

* * * * *